Feb. 20, 1973  C. H. McGILL  3,717,060
ROTOR TUBE FOR A BERIA-TYPE CUTTER
Filed Dec. 21, 1970

INVENTOR.
CHARLES H. McGILL
BY
ATTORNEY

United States Patent Office 3,717,060
Patented Feb. 20, 1973

3,717,060
ROTOR TUBE FOR A BERIA-TYPE CUTTER
Charles H. McGill, Decatur, Ala., assignor to
Monsanto Company, St. Louis, Mo.
Filed Dec. 21, 1970, Ser. No. 99,936
Int. Cl. B23d 33/02
U.S. Cl. 83—403                    1 Claim

ABSTRACT OF THE DISCLOSURE

Apparatus for cutting lengths from an advancing tow having a rotatable disc formed with a passageway leading from the center of one of its faces and terminating on its periphery. A stationary cutting blade positioned adjacent the periphery of the disc cuts the tow into short lengths as the disc is rotated at high speed. The passageway in the disc includes a tube having three distinct portions, the first portion being an L-shaped opening of cylindrical cross-section, a second portion forming a conical section tapering away from the first portion and a third portion of cylindrical cross-section being in axial alignment with the first and second portions, the third portion being of smaller diameter than the first portion.

BACKGROUND OF THE INVENTION

(1) Field of the invention

The present invention relates to a cutter rotor tube having a novel geometry. More particularly, it relates to a cutter rotor tube having characteristics favorable to flow for filamentary materials having high denier or filamentary materials having bulkiness.

(2) Description of the prior art

The conventional Beria cutter or Beria-type cutter comprises a rotating disc having an axial opening leading to a radial opening on said disc. Filamentary material is fed in the form of tow into the radial opening and advanced outward through a ferrule at between about 300 to about 1600 ft./min. in the radial opening by centrifugal forces created by the rotation of disc at a high speed, viz, circa 2,400 to 5,300 r.p.m. A blade positioned adjacent to the periphery of the disc cuts the tow into short lengths. One of the disadvantages of this type of cutter is that the filaments do not all extend radially outward from the ferrule and, as a result, some of the fibers are cut to undesirable lengths.

The prior art teaches a number of cutting devices as shown especially by the Beria cutter used extensively for cutting continuous textile filaments into staple. One characteristic of this type of cutter is that a twist as well as a bloom are inherently formed during the processing thereof as a result of the high rotative speed of the cutter. A number of difficulties have been presented by the conventional geometry associated with these cutters. The prior art does not teach the criticality and advantages of using a combination of shaped configurations within such rotating discs.

Various means have been employed in the art to improve the uniformity of tow feeding and uniform production of staple materials, many of which have utilized devices outside or associated externally from the cutting rotor device. Many of these devices have produced at best only limited success. Accordingly, there is a need for other means by which to uniformly feed an advancing tow and to produce a uniform staple, especially with respect to a high total denier material and also materials of relatively high bulkiness. It is well known that the quality of synthetic filaments produced in a given process may vary depending upon a number of factors.

SUMMARY OF THE INVENTION

Briefly, in accordance with this invention in combination with an apparatus for cutting the lengths from a supply of advancing tow, said apparatus being of the type having a rotatable disc formed with a passageway leading from the center of one of its faces and terminating on its periphery, a stationary cutting member formed with a cutting edge located at the periphery of said disc, means for rotating the disc to subject the tow to the action of centrifugal forces, the improvement comprising a rotor tube attached to said rotatable disc, said tube having a passageway defined by three distinct portions, the first portion being an L shaped opening of cylindrical cross-section, a second portion forming a conical section tapering away from said first portion and a third portion having a substantially cylindrical cross-section and being in communication and in axial alignment with said first and second portions, said third portion being of a smaller diameter than said first portion.

A principal object of this invention is to provide a novel and improved rotor disc for yielding a uniform tow staple.

A further object of the invention is to provide an improved rotor tube structure of high-operating efficiency capable of handling high denier and filamentary materials having considerable bulkiness.

Another object of this invention is to provide a device for uniform feeding of a tow to a cutter blade through a rotating disc. Other objects of the invention will become apparent when the following detailed description is read in conjunction with the drawing, in which.

Figure 1:
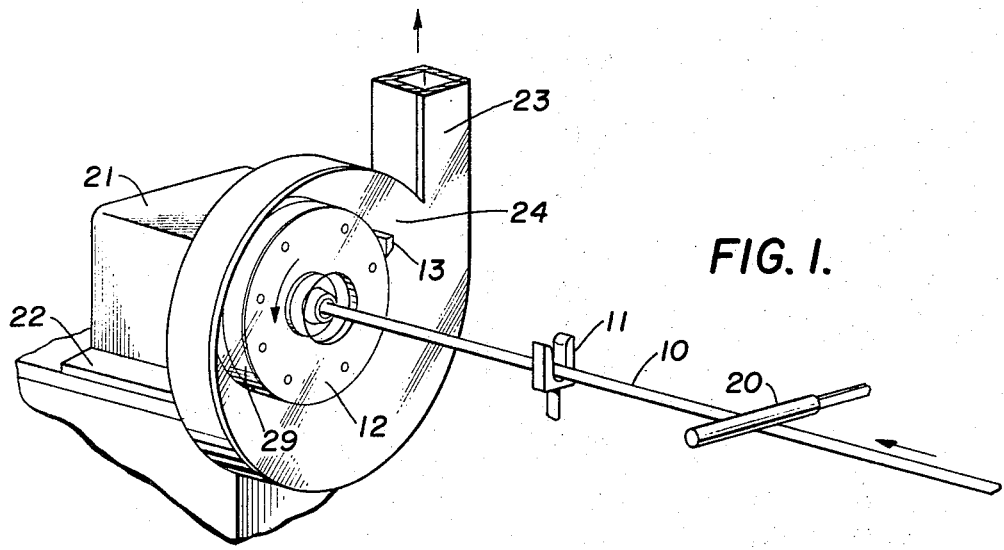
FIG. 1 is a view showing a rotating disc and housing.

Referring now to FIG. 1, there is shown a base 22 upon which a housing 21 is secured and provided with means for driving (designated M) a rotatable disc 12. Immediately surrounding the rotatable disc 12 is a housing 24 having a chimney 23. Attached to the housing 24 is a cutting member 13 in proximate relationship to the peripheral surface of the rotatable disc 12. A detector 20 in contact with tow 10 is provided for detecting any deformities or irregularities on tow 10 which pass through a guide means such as a U-shaped member 11.

Figure 2:
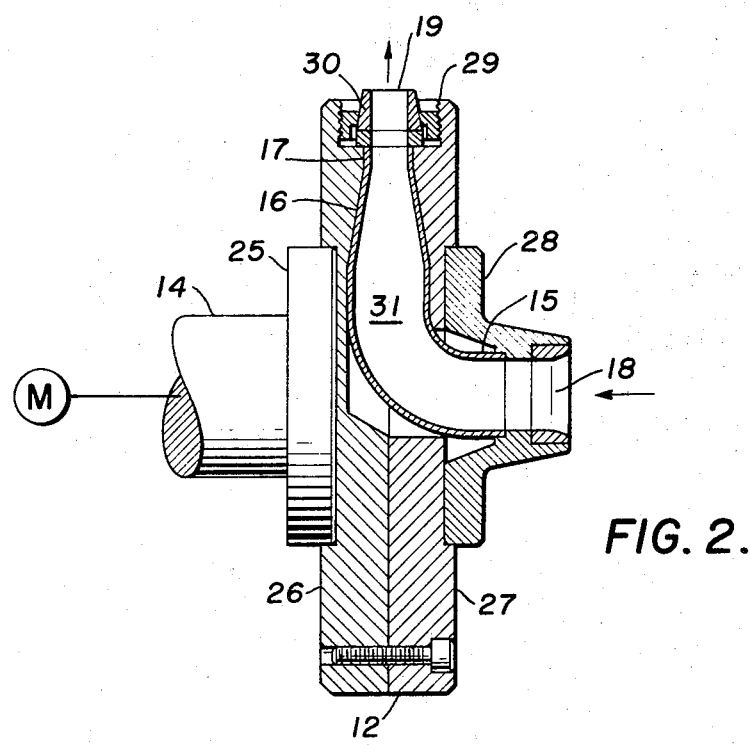
FIG. 2 is a cross-sectional view of a rotating disc showing the defined portions of the opening and passageway of the rotor tube through which filamentary material is advanced just prior to cutting.

FIG. 2 depicts a shaft 14 having a flange 25 secured to the rotatable disc 12. The shaft may be rotated by any well-known means. The rotatable disc 12 is provided with a forward face 27 and a rearward face 26. Substantially, centrally located upon the forward face 27 is a raised portion 28 which presents an opening 18 containing a rotor tube, designated 31. Opening 18 offers and L-shaped communication for said tube 31 comprising a length approximately ⅔ of the radius of the rotatable disc 12. The opening 18 is substantially cylindrical in its cross-section diameter. Throughout the first portion 15, the distal portion of said portion 15 is joined to a conical section 16 tapering away from said opening 18. The length of said conical section 16 is approximately from ¼ to about ⅟₁₆ of the radius of the rotatable disc 12. The distal portion of said conical section 16 is in direct communication with a third cylindrical portion 17.

In operation a filamentary material or tow 10 is passed beneath a detector 20 through a guide 11 and into the mouth of the opening 18 and through the first portion 15 and thereafter through conical section 16 and the third portion 17. The motor turns the rotatable disc 12 whereby the tow 10 is centrifically forced to the outer peripheral surface 29 and into contact with cutting member 13. The bloom and twist inherently formed upon the advancing tow just prior to being cut by member 13 is partially restricted within the confines of the L-shaped opening 18 formed by the first portion 15. The tapering section as provided by the conical portion 16 uniformly removes the bloom and twist and, seemingly, properly tensions the filamentary or funicular materials, which thereafter pass at high speed through the third portion 17 of said tube 31, whereby a uniform and straight multiplicity of filaments is continuously presented to the cutting member 13.

It has been found that tow of high bulkiness or denier which is subjected to the centrifugal force becomes very uniform and straight after passing through the rotor tube herein described and therefore allows easier feed than any conventional type of configuration heretofore employed for subsequent engagement with cutting means.

The rotatable disc 12 may be provided with a ferrule 30 connected to the exit 19 of the third portion 17. The ferrule 30 may conveniently be made out of stainless steel or a high carbon steel.

It is understood that the embodiment disclosed herein is merely illustrative and that numerous other embodiments can be contemplated without departing from the spirit and scope of the invention.

I claim:

1. In combination with an apparatus for cutting lengths of high denier material from a supply of advancing tow, said apparatus being of the type having a rotatable disc formed with a passageway leading from the center of one of its faces and terminating on its periphery, a cutting member having a cutting edge located at the periphery of said rotatable disc, means for rotating said disc to subject the tow to the action of centrifugal forces, the improvement which comprises a rotor tube attached within said rotatable disc and having a passageway defined by three distinct portions, the first portion being an L-shaped opening of cylindrical cross-section, a second portion forming a conical section tapering away from the first portion, and a third portion having a substantially-cylindrical cross-section and being in communication and in axial alignment with said first and second portions, said third portion having a smaller diameter than said first portion, said first portion having a length of about ⅔ of the radius of the rotatable disc, said first, second and third portions forming one integral and continuous tube.

References Cited

UNITED STATES PATENTS

| | | | |
|---|---|---|---|
| 2,631,667 | 3/1953 | Schmitz, Jr. | 83—403 |
| 3,161,100 | 12/1964 | Resor | 83—403 |
| 2,559,700 | 7/1951 | Bauer | 83—403 X |

JAMES M. MEISTER, Primary Examiner

U.S. Cl. X.R.

83—913